United States Patent
Ueno

(10) Patent No.: US 10,613,520 B2
(45) Date of Patent: Apr. 7, 2020

(54) DATA SETTING SYSTEM FOR ROBOT, DATA SETTING METHOD AND PROGRAM

(71) Applicant: FANUC CORPORATION, Minamitsuru-gun, Yamanashi (JP)

(72) Inventor: Masahiro Ueno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 15/903,647

(22) Filed: Feb. 23, 2018

(65) Prior Publication Data

US 2018/0253083 A1    Sep. 6, 2018

(30) Foreign Application Priority Data

Mar. 2, 2017  (JP) ................................ 2017-039412

(51) Int. Cl.
   *B25J 9/16*      (2006.01)
   *G05B 19/418*  (2006.01)
   *B25J 13/00*    (2006.01)

(52) U.S. Cl.
   CPC ...... *G05B 19/41815* (2013.01); *B25J 9/1656* (2013.01); *B25J 9/1682* (2013.01);
   (Continued)

(58) Field of Classification Search
   CPC ........ G05B 19/41815; G05B 19/41845; G05B 19/41855; B25J 9/1682; B25J 13/006;
   (Continued)

(56) References Cited

U.S. PATENT DOCUMENTS

2003/0208294 A1   11/2003  Cheng et al.
2003/0220715 A1*  11/2003  Kneifel, II ............. B25J 9/1682
                                                              700/248
(Continued)

FOREIGN PATENT DOCUMENTS

CN     101204813      6/2008
CN     101667033      3/2010
(Continued)

OTHER PUBLICATIONS

Notification of Reasons for Refusal dated Oct. 23, 2018 in corresponding Japanese Patent Application No. 2017-039412.
(Continued)

*Primary Examiner* — Dale Moyer
(74) *Attorney, Agent, or Firm* — Wenderoth, Lind & Ponack, L.L.P.

(57)    ABSTRACT

In a data setting system in which a plurality of control devices that control robots and a management device that manages the control devices are connected through a network, the management device includes: a data group setting portion that sets a data group formed with the control devices for which the same function is set among the plurality of control devices; and a setting transmission portion that transmits, to each of the data groups, setting information for setting the control devices belonging to the data group, and the control device includes: a setting performance portion that performs the setting of the control devices based on the setting information transmitted from the management device.

9 Claims, 5 Drawing Sheets

(52) U.S. Cl.
CPC ...... *B25J 13/006* (2013.01); *G05B 19/41845* (2013.01); *G05B 19/41855* (2013.01); *Y02P 90/02* (2015.11)

(58) Field of Classification Search
CPC .......... B25J 9/0084; B25J 9/1602; B25J 9/16; Y02P 90/02
See application file for complete search history.

(56) References Cited

U.S. PATENT DOCUMENTS

| | | | | |
|---|---|---|---|---|
| 2010/0145514 | A1* | 6/2010 | Kim | B25J 9/161 700/248 |
| 2011/0301719 | A1* | 12/2011 | Kuroda | G05B 19/052 700/7 |
| 2014/0277714 | A1* | 9/2014 | Izumi | B25J 9/0084 700/248 |
| 2015/0032256 | A1* | 1/2015 | Hashiguchi | G05B 19/41845 700/248 |
| 2018/0050450 | A1* | 2/2018 | Parrott | H04W 4/80 |

FOREIGN PATENT DOCUMENTS

| | | |
|---|---|---|
| CN | 102365594 | 2/2012 |
| CN | 104516283 | 4/2015 |
| CN | 105204394 | 12/2015 |
| CN | 105955101 | 9/2016 |
| DE | 11 2009 004 593 T5 | 4/2013 |
| JP | 8-263125 | 10/1996 |
| JP | 2007-237300 | 9/2007 |
| JP | 2010-131748 | 6/2010 |
| JP | 2015-231656 | 12/2015 |

OTHER PUBLICATIONS

Office Action dated Jul. 16, 2019 in Chinese Patent Application No. 201810159685.2.

Office Action dated Jan. 30, 2020 in German Patent Application No. 10 2018 202 820.6.

* cited by examiner

DATA SETTING SYSTEM FOR ROBOT, DATA SETTING METHOD AND PROGRAM

This application is based on and claims the benefit of priority from Japanese Patent Application No. 2017-039412, filed on 2 Mar. 2017, the content of which is incorporated herein by reference.

BACKGROUND OF THE INVENTION

Field of the Invention

The present invention relates to a data setting system for a robot, a data setting method and a program.

Related Art

Conventionally, a manufacturing line in which a product is machined by a plurality of robots is utilized. When the manufacturing line as described above is newly established, the input and output of data between the robots and peripheral devices and the like are needed, and thus it is necessary to make a data setting on a robot control device which controls the individual robots. Here, examples of the data setting on the robot control device include the allocation of an I/O region, the setting of a tool coordinate system, the setting of a user coordinate system, the setting of a robot wrist load, the setting of a user alarm, the setting of a macro program, the input of a model program and the writing of a necessary comment. The data setting operation described above is generally performed for each of the robots by passing the data thereinto through manual input, a storage medium or the like. In a case where settings are made on a plurality of robots as described above, when the number of robots is increased, a large number of steps are needed for the operation. Hence, Patent Document 1 discloses a technology in which setting data is copied to all robots which are connected through a network.

Patent Document 1: Japanese Unexamined Patent Application, Publication No. 2015-231656

SUMMARY OF THE INVENTION

However, in the technology disclosed in Patent Document 1, it is necessary to manage the copying of the setting data to all the robots which are connected through the network. Hence, as the number of types of machining functions of the robots (that is, the types of setting data) is increased, the time and effort necessary for the copying of the setting data are increased.

An object of the present invention is to more easily make settings for a plurality of robots.

(1) A data setting system (for example, a data setting system 1 which will be described later) of the present invention is a data setting system in which a plurality of control devices (for example, control devices 20 which will be described later) that control robots and a management device (for example, a management device 30 which will be described later that manages the control devices are connected through a network,
where the management device includes:
a data group setting portion (for example, a group setting portion 31b which will be described later) that sets a data group formed with the control devices for which the same function is set among the plurality of control devices; and a setting transmission portion (for example, a setting transmission portion 31c which will be described later) that transmits, to each of the data groups, setting information for setting the control devices belonging to the data group, and the control device includes
a setting performance portion (for example, a setting performance portion 21c which will be described later) that performs the setting of the control devices based on the setting information transmitted from the management device.

(2) Preferably, in the data setting system of (1), the setting transmission portion transmits the setting information to any one of the control devices in the data group, and the control device further includes:
a setting instruction portion (for example, a setting instruction portion 21e which will be described later) that transmits, based on the setting information transmitted from the management device, to the other control devices belonging to the same data group as the control device, setting information for performing the setting of the other control devices.

(3) Preferably, in the data setting system of (1) or (2), the management device further includes:
a cell setting portion (for example, a group setting portion. 31b which will be described later) that sets, among the plurality of control devices, a plurality of cells corresponding to groups of the robots which cooperatively perform machining on a product, and
the setting transmission portion transmits the setting information to any one of the control devices for which the same function is set in each of the cells.

(4) Preferably, in the data setting system of (1) to (3), the management device further includes:
a setting confirmation portion (for example, a line management portion 31d which will be described later) that acquires a state of the setting of the control device so as to confirm whether or not the state of the setting coincides with the setting information transmitted from the setting transmission portion.

(5) Preferably, in the data setting system of (1) to (4), the data group is determined based on address information set for the robot.

(6) Preferably, in the data setting system of (1) to (5), the management device is configured with any one of the plurality of control devices.

(7) A data setting method of the present invention is a data setting method performed in a data setting system in which a plurality of control devices that control robots and a management device that manages the control devices are connected through a network,
where the management device performs:
a data group setting step of setting a data group formed with the control devices for which the same function is set among the plurality of control devices; and
a setting transmission step of transmitting, to each of the data groups, setting information for setting the control devices belonging to the data group, and
the control device performs:
a setting performance step of performing the setting of the control devices based on the setting information transmitted from the management device.

(8) A program of the present invention which instructs a computer configuring a management device in a data setting system where a plurality of control devices that control robots and the management device that manages the control devices are connected through a network to realize:
a data group setting function of setting a data group formed with the control devices for which the same function is set among the plurality of control devices; and a setting transmission function of transmitting, to each of the data groups, setting information for setting the control devices belonging to the data group.

(9) A program of the present invention which instructs a computer configuring a control device in a data setting system where a plurality of control devices that control robots and a management device that manages the control devices are connected through a network to realize:
a setting performance function of performing, based on setting information that is information transmitted from the management device and that sets, among the plurality of control devices, for each data group formed with the control devices for which the same function is set, the control devices belonging to the data group, the setting of the control devices.

According to the present invention, it is possible to more easily make settings for a plurality of robots.

DETAILED DESCRIPTION OF THE INVENTION

Figure 1:
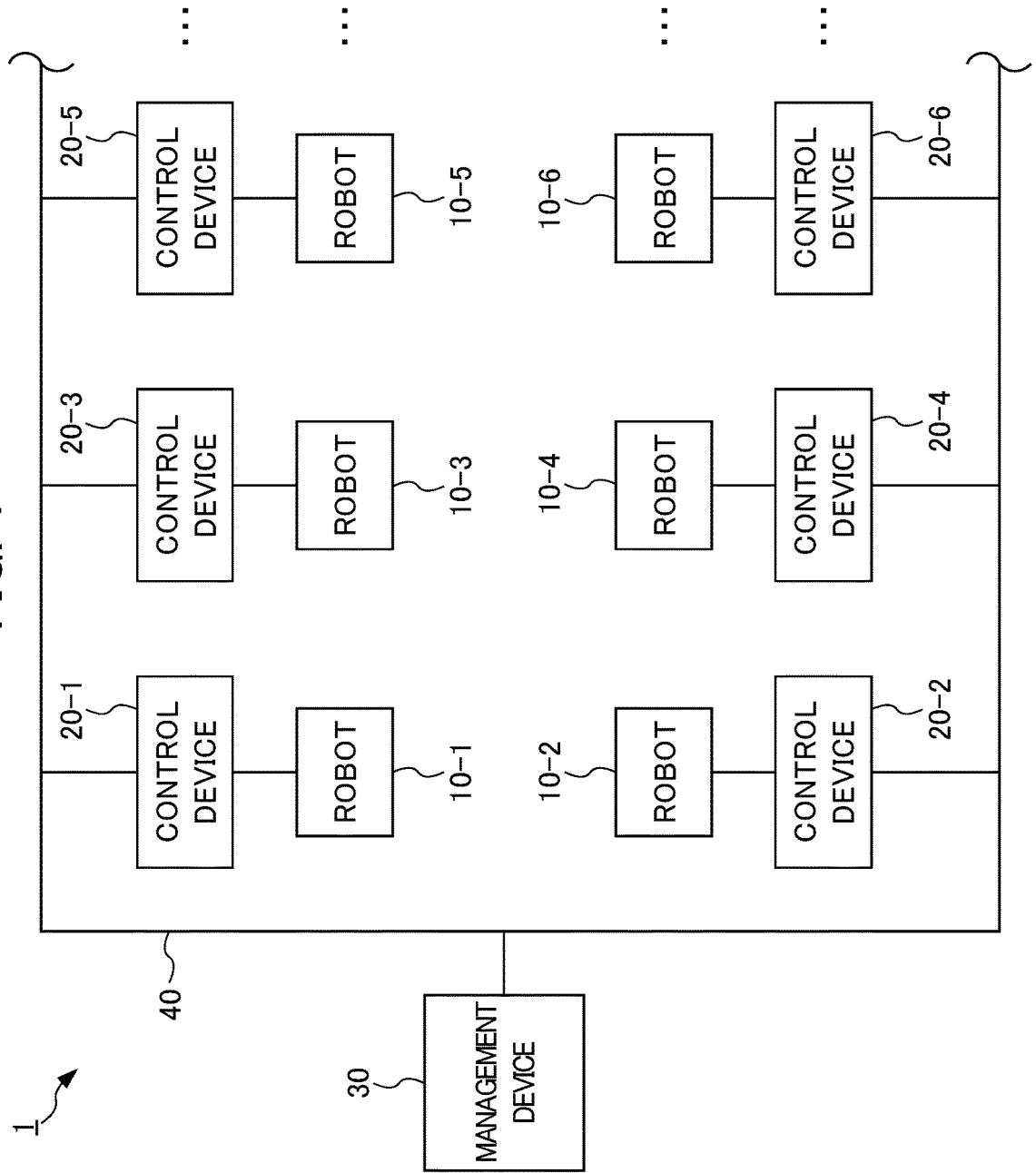
FIG. 1 is a schematic view showing the system configuration of a data setting system according to an embodiment of the present invention.

An embodiment of the present invention will be described below with reference to drawings.
[Configuration]
FIG. 1 is a schematic view showing the system configuration of a data setting system 1 according to the embodiment of the present invention.

As shown in FIG. 1, the data setting system 1 is configured so as to include robots 10-1 to 10-$n$ ($n$ is an integer of 2 or more), control devices 20-1 to 20-$n$ for the robots 10-1 to 10-$n$ and a management device 30, and the control devices 20-1 to 20-$n$ and the management device 30 are configured so as to be able to communicate with each other through a network 40 such as a wired or wireless LAN (Local Area Network). The robots 10-1 to 10-$n$ and the control devices 20-1 to 20-$n$ are configured so as to be able to communicate with each other through a network such as a wired or wireless LAN or a communication cable such as a USE (Universal Serial Bus) cable. In the following description, when the robots 10-1 to 10-$n$ are not distinguished, they are simply referred to as the robots 10, and when the control devices 20-1 to 20-$n$ are not distinguished, they are simply referred to as the control devices 20.

The robots 10 is an industrial robot which is installed in a manufacturing line, and has the function of switching a plurality of hands and tools by spot welding, transport or a tool changer. In the present embodiment, IP addresses are previously set for the robots 10-1 to 10-$n$, and the values of the IP addresses are stored in registers incorporated in the robots 10-1 to 10-$n$.

The robots 10-1 to 10-$n$ configure, according to the configuration of the manufacturing line, a cell which is formed by a plurality of robots 10. The cell which is formed by a plurality of robots 10 is one which is obtained by selecting, according to a product manufactured in the manufacturing line, robots from the robots 10-1 to 10-$n$ and groping them, and one group of the robots 10 configuring the cell cooperate with each other so as to perform machining on one product. In the present embodiment, a plurality of homogeneous cells are configured by the robots 10-1 to 10-$n$. In other words, in the manufacturing line shown in the present embodiment, it is possible to simultaneously perform machining on the same number of products as the number of cells configured by the robots 10-1 to 10-$n$. When cells are configured, to which cells the individual robots 10 belong is managed by the IP addresses (address information) set for the individual robots 10. Specifically, to which cells the individual robots 10 belong by the IP address thereof is set, and a cell ID for indicating the cell to which the present device belongs is stored in the incorporated resister.

The control devices 20 configure a robot controller which controls the robots 10. Specifically, the control devices 20 execute a program for controlling the robots 10, and thereby output an instruction to the robots 10 so as to make the robots 10 perform a predetermined operation. In the present embodiment, the control devices 20-1 to 20-$n$ are connected so as to respectively correspond to the robots 10-1 to 10-$n$, and the control devices 20-1 to 20-$n$ respectively control the robots 10-1 to 10-$n$. Since the robots 10-1 to 10-$n$ are respectively connected to the control devices 20-1 to 20-$n$, in the present embodiment, the IP addresses of the control devices 20-1 to 20-$n$ are the same as hose of the robots 10-1 to 10-$n$. However, different IP addresses can be set for the robots 10-1 to 10-$n$ and the control devices 20-1 to 20-$n$.

The control devices 20-1 to 20-$n$ configure cells so as to correspond to the robots 10-1 to 10-$n$. In the control devices 20 which configure one cell, in order to realize functions allocated to the robots 10 within the cell, a program for making the robots 10 perform intended operations is installed. In a plurality of cells, any one of the control devices 20 which configure the same function is set to a representative control device that represents the control devices 20 having the function.

When the control device 20 which is the representative control device receives an instruction for setting the control devices 20 from the management device 30, the representative control device makes a setting for the representative control device and transmits an instruction to the other control devices 20 having the same function in the other cells (hereinafter, a group including the other control devices 20 and the representative control device is referred to as a "data group") to copy the setting of the present control device. The other control devices 20 which receive the instruction from the control device 20 serving as the representative control device perform the copying of the setting so as to install the same function as the control device 20 serving as the representative control device in the present embodiment, as an example, four data groups G1 to G4 are assumed to be configured. Data group IDs that indicate the data groups to which the individual control devices 20 belong are written in the registers incorporated in the robots 10.

The management device 30 is configured with an information processing device such as a PC (Personal Computer) or a server device, and integrally manages the settings for the individual control devices 20. In the present embodiment, the function of the management device 30 can be allocated to any one of the control devices 20. Specifically, for example, when a manufacturing line is newly set up or changed, information indicating the configuration of the manufacturing line is input to the management device 30 by an operator. For example, the functions of the robots 10 configuring the cells, the number of cells formed and the like are input by the operator to the management device 30. Here, information as to which one of the control devices 20 configuring the same function in a plurality of cells is set to the representative control device is also input by the operator. When the representative control device is set, among the control devices 20 configuring the same function in a plurality of cells, for example, the control device whose value of the IP address is the lowest can be automatically set.

Then, the management device 30 transmits an instruction to the control devices 20 configuring the representative control device to set data and a program (hereinafter referred to as "setting information" as necessary) corresponding to the control devices 20 configuring the cell. For example, when each cell is configured with four control devices 20, and the control devices 20 within the cell are respectively set to different functions F1 to F4, the management device 30 transmits, to the representative control device among the control devices 20 (the control devices 20 in the data group G1) set to the function. F1, an instruction to set the data and the program corresponding to the function F1. Likewise, the management device 30 sequentially transmits, to the representative control devices among the control devices 20 (the control devices 20 in the data groups G2 to G4) set to the functions F2 to F4, instructions to set the data and the programs corresponding to the functions F2 to F4. In other words, the management device 30 manages the setting information for each of the data groups, and performs the setting of the setting information only for the control devices 20 serving as the representative control devices. As described above, the control devices 20 serving as the representative control devices transmit instructions to the control devices 20 other than the representative control devices to copy the settings.

The management device 30 which makes settings on a plurality of types of functions by the procedure described above only makes a setting for one control device 20 (the representative control device) on each of the functions, and the control device 20 serving as the representative control device only makes a plurality of control devices 20 (the control devices 20 within each data group) copy the same setting, with the result that it is possible to more easily make settings for controlling a plurality of robots 10.

[Configuration of Control Device 20]

Figure 2:
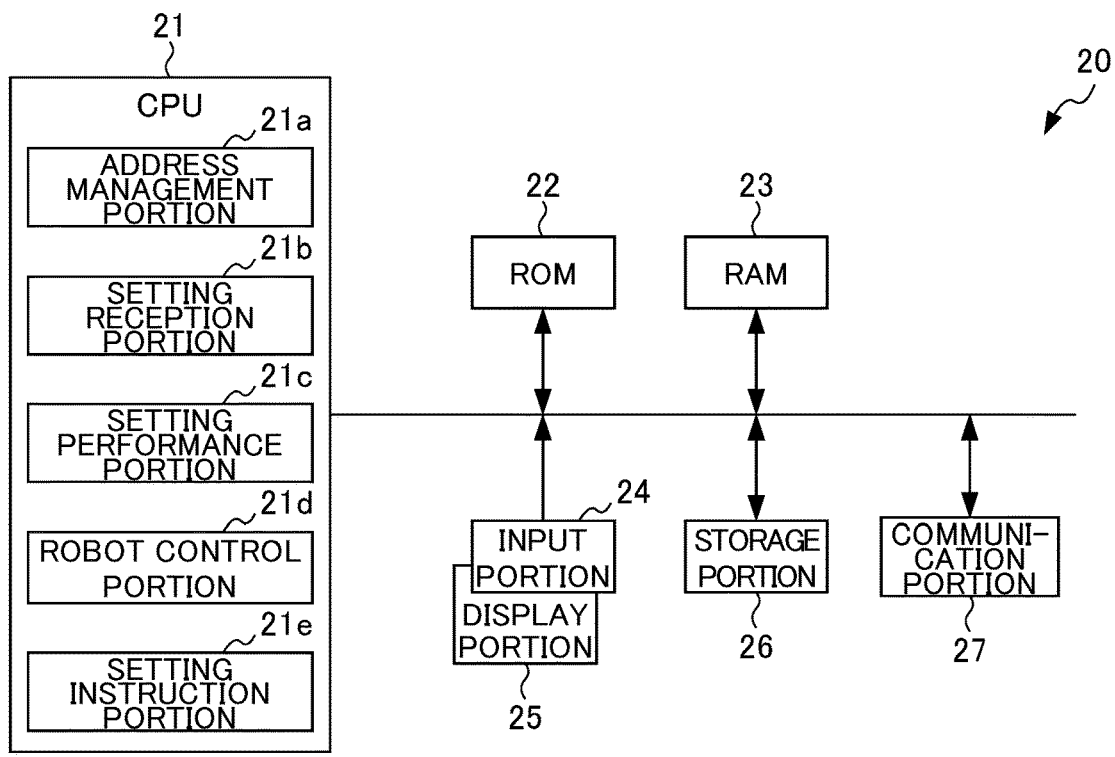
FIG. 2 is a block diagram showing the configuration of a control device.

The configuration of the control device 20 will then be described. FIG. 2 is a block diagram showing the configuration of the control device 20. As shown in FIG. 2, the control device 20 includes a CPU (Central Processing Unit) 21, a ROM 22, a RAM 23, an input portion 24, a display portion 25, storage portion 26 and a communication port ion 27. In the following description, a case where the control device 20 functions as the representative control device is assumed.

The CPU 21 executes various types of programs stored in the storage portion 26 so as to control the entire control device 20. For example, the CPU 21 receives an instruction from the management device 30 so as to execute a program for processing (hereinafter referred to as "setting transmission processing") in which settings are made on the data and the programs for the present control device and the control devices 20 within the data group. The CPU 21 also executes a program for processing (hereinafter referred to as "group determination processing") in which the data group is determined from the IP address. The CPU 21 executes the programs for the setting transmission processing and the group determination processing, and thus in the CPU 21, as a functional configuration, an address management portion 21a, a setting reception portion 21b, a setting performance portion 21c, a robot control portion 21d and a setting instruction portion 21e are formed.

The address management portion 21a reads the IP address set in the register of the robot 10 controlled by the present device (the control device 20), and manages the read IP address as the IP address which is common to the present device and the robot to be controlled. The address management portion 21a writes a cell ID corresponding to the instruction from the management device 30 in the register of the robot 10 controlled by the present device (the control device 20). The address management portion 21a executes the program (group determination program) for the group determination processing so as to determine the data group to which the robot 10 controlled by the present device (the control device 20) belongs. Then, the address management portion 21a writes the determined data group ID in the register incorporated in the robot 10 controlled by the present device (the control device 20).

In the group determination program, a conditional statement is written which makes the IP addresses of all the robots correspond to any of the data groups, and the address management portion 21a executes the group determination program with reference to the IP address of the present device and thereby can determine the data group of the robot 10 controlled by each of the control devices 20. In other words, the group determination program has a function corresponding to table data which makes the IP address correspond to the data group. The group determination program is a program in which its size is relatively small and in which a processing load at the time of execution is small, and in the present embodiment, the group determination program is previously transmitted from the management device 30 to ail the control devices 20 by broadcast or the like. In the group determination program, as an example, a conditional statement as mentioned below can be described so as to correspond to all the IP addresses.

IF (system variable indicating IP address)=x1, data group ID=y1

Here, x1 represents a system variable indicting the IP address of one robot 10, and y1 represents a data group ID indicating any one of the data groups G1 to G4.

The setting reception portion 21b receives the data and the programs (setting information) from the management device 30, and stores, in the storage portion 26, the data and the programs received. The setting reception portion 21b receives, among the data and the programs for the control devices 20 of the data groups transmitted by the management device 30, the data and the program for the data group to which the control device 20 belongs.

The setting performance portion 21c uses the data and the program received by the setting reception portion 21b so as to produce a setting file for the setting of the present device (the control device 20), and performs the setting of the present device based on the setting file. The setting performance portion 21c stores the produced setting file in the storage portion 26. In this way, the operation of the robot 10 controlled by the control device 20 is set. Examples of the details of the setting file include the allocation of an I/O region of an interlock signal output from the robot 10 to a machine tool or the like, the setting of a tool coordinate system (coordinate system for defining a tip end point of the tool of a robot hand), the setting of a user coordinate system (coordinate system which can be used when the load and unload operation of the robot 10 is defined, the setting of a wrist load of the robot 10, the setting of a user alarm, the setting of a macro program, the input of a model program and the writing of a necessary comment. When the setting performance portion 21c receives a request for acquiring the state of the actual setting from the management device 30, the setting performance portion 21c transmits, to the management device 30, information (such as set data or a program to be executed) indicating the result of the setting based on the setting file.

The robot control portion 21d controls the operation of the robot 10 according to the setting by the setting performance portion 21c. In this way, the robot 10 controlled by the control device 20 is brought into a state where the robot 10 performs the function corresponding to the instruction from the management device 30 such as the function of switching a plurality of hands and tools by spot welding, transport or a tool changer.

The setting instruction portion 21e transmits an instruction to the other control devices 20 of the data group where the control device 20 is the representative control device to copy the same setting as the present device. In the present embodiment, the setting instruction portion 21e transmits the setting file produced by the setting performance portion 21c to the other control devices 20 of the data group where the control device 20 is the representative control device, and instructs them to copy the setting file.

Unlike the above-described functional configuration of the control device 20 serving as the representative control device, in the control devices 20 other than the representative control device, the address management portion 21a executes the group determination program so as to determine the data group, the setting reception portion 21b receives the setting file from the control device 20 serving as the representative control device and the setting performance portion 21c performs the setting of the present device based on the received setting file, with the result that the operations of the robots 10 controlled by the control devices 20 are set.

In the ROM 22, various types of system programs for controlling the control devices 20 are previously written. The RAM 23 is formed with a semiconductor memory such as a DRAM (Dynamic Random Access Memory), and stores data which is generated when the CPU 21 performs various types of processing. The input portion 24 is configured with an input device such as a touch sensor, and receives the input of various types of information to the control devices 20 by a user.

The display portion 25 is configured with a display device such as an LCD (Liquid Crystal Display), and displays the results of various types of processing by the control devices 20. In the present embodiment, a touch panel is configured by arranging the input portion 24 such that the input portion 24 is overlaid on the display portion 25, and the touch panel functions as a teaching operation panel for performing the input and output on the control devices 20. The storage portion 26 is configured with a nonvolatile storage device such as a hard disc or a flash memory, and stores the program for the setting transmission processing and the like. The communication portion 27 includes a communication interface, such as a wired or wireless LAN or a USB, which performs signal processing based on a predetermined communication standard, and controls communication which is performed by the control device 20 with the management device 30.

[Configuration of Management Device 30]

Figure 3:
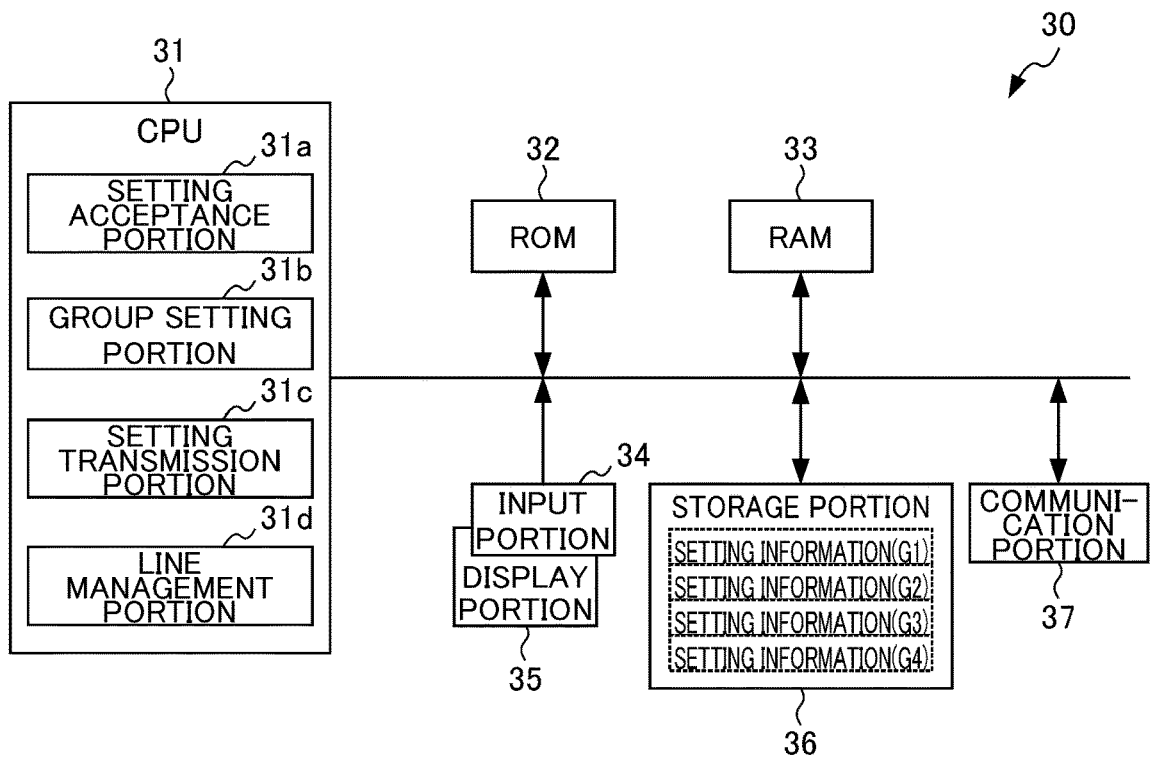
FIG. 3 is a block diagram showing the configuration of a management device.

The configuration of the management device 30 will then be described. FIG. 3 is a block diagram showing the configuration of the management device 30. As shown in FIG. 3, the management device 30 includes a CPU 31, a ROM 32, a RAM 33, an input portion 34, a display portion 35, a storage portion 36 and a communication portion 37.

The CPU 31 executes various types of programs stored in the storage portion 36 so as to control the entire management device 30. For example, the CPU 31 receives an input by the operator so as to execute a program for processing (hereinafter referred to as "data setting processing") in which settings are made on the data and the program for the control device 20 serving as the representative control device. The CPU 31 also executes a program for processing (hereinafter referred to as "setting confirmation processing") in which the state of the setting of each of the control devices 20 is confirmed.

The CPU 31 executes the programs for the data setting processing and the setting confirmation processing, and thus in the CPU 31, as a functional configuration, a setting acceptance portion 31a, a group setting portion 31b, a setting transmission portion 31c and a line management portion 31d are formed. The setting acceptance portion 31a accepts the input of information (for example, the functions of the robots 10 configuring the cell, the number of cells configured and the IP address of the control device 20 serving as the representative control device) indicating the configuration of the manufacturing line by the operator.

The group setting portion 31b specifies the robots 10 configuring each cell based on the information indicating the configuration of the manufacturing line accepted by the setting acceptance portion 31a so as to set the cell. The group setting portion 31b produces a group determination program for determining the data group from the IP address based on the information indicating the configuration of the manufacturing line accepted by the setting acceptance portion 31a. Then, the group setting portion 31b transmits the produced group determination program to all the control devices 20 by broadcast or the like in this way, the group setting portion 31b sets the data group for a plurality of control devices 20. Furthermore, based on the IP address of the control device 20 serving as the representative control device accepted by the setting acceptance portion 31a, the group setting portion 31b notifies the control device 20 specified as the representative control device that the control device 20 is the representative control device of the data group, and thus the representative control device of each data group is set.

For the data groups G1 to G4, the setting transmission portion 31c transmits the data and the programs (setting information) corresponding to the control devices 20 configuring each of the data groups to the control device 20 serving as the representative control device.

The line management portion 31d performs the setting confirmation processing for confirming the state of the setting of each of the control devices 20. Specifically, the line management portion 31d acquires the state of the setting of each of the control devices 20, and compares it with reference information indicating the state of the intended setting so as to confirm the state of the setting of each of the control devices 20. When the state of the setting of each of the control devices 20 coincides with the state of the setting indicated by the reference information, the line management portion 31d determines that the settings of the control devices 20 are completed so as to allow the operation of the manufacturing line. On the other hand, when the state of the setting of each of the control devices 20 does not coincide with the state of the setting indicated by the reference information, the line management portion 31d determines that the settings of the control devices 20 are not completed so as to display (alert display), on the display portion 35, the IP address of the control device 20 in which the state of the setting does not coincide with the reference information and the details of the setting which do not coincide therewith. Here, a warning light (patrol lamp or the like) included in the robot 10 connected to the control device 20 may be lit. When an alert display is produced for the entire data group, the alert display may be produced in the control device 20 serving as the representative control device or a warning lamp of the robot 10 connected to this control device 20 may be lit.

Here, although the reference information indicates information corresponding to the information indicating the configuration of the manufacturing line accepted by the setting acceptance portion 31a, the issuer thereof is an entity which is different from information indicating the configuration of the manufacturing line input to the setting acceptance portion 31a. For example, when the information indicating the configuration of the manufacturing line input to the setting acceptance portion 31a is produced by a manager A, the reference information is produced by a manager B who is different from the manager A. In this way, the function of checking the information by a plurality of entities is exerted, and thus it is possible to enhance the reliability of accuracy of the information which is set.

After the setting of the control devices 20 is completed, the line management portion 31d starts the operation of the manufacturing line, and sequentially acquires the state of the operation of each of the control devices 20 so as to monitor the state of the operation of the entire manufacturing line and the control devices 20. When in the entire manufacturing line and the control devices 20, a state indicting an abnormality (such as the output of an alert signal) is detected, the line management portion 31d produces an alert display indicating the details of the abnormality on the display portion 35.

In the ROM 32, various types of system programs for controlling the management device 30 are previously written. The RAM 33 is configured with a semiconductor memory such as a DRAM, and stores data which is generated when the CPU 31 performs various types of processing. The input portion 34 is configured with an input device such as a touch sensor, and receives the input of various types of information to the management device by the user.

The display portion 35 is configured with a display device such as an LCD, and displays the results of various types of processing by the management device 30. In the present embodiment, a touch panel is configured by arranging the input portion 34 such that the input portion 34 is overlaid on the display portion 35, and the touch panel functions as a teaching operation panel for performing the input and output on the management device 30. The storage portion 36 is configured with a nonvolatile storage device such as a hard disc or a flash memory, and stores the program for the data setting processing and the like. In the storage portion 36, the setting information for each of the data groups G1 to G4 input by the operator is stored. The communication portion 37 includes a communication interface, such as a wired or wireless LAN or a USB, which performs signal processing based on a predetermined communication standard, and controls communication which is performed by the management device 30 with the control devices 20.

[Operation]
The operation of the data setting system 1 will then be described.
[Data Setting Processing]
The data setting processing performed by the management device 30 will first be described. When the data setting processing is performed, the group setting portion 31b previously transmits the group determination program to each of the control devices 20, the group determination program is performed in each of the control devices 20 and thus the data groups G1 to G4 for a plurality of robots 10 are determined.

Figure 4:
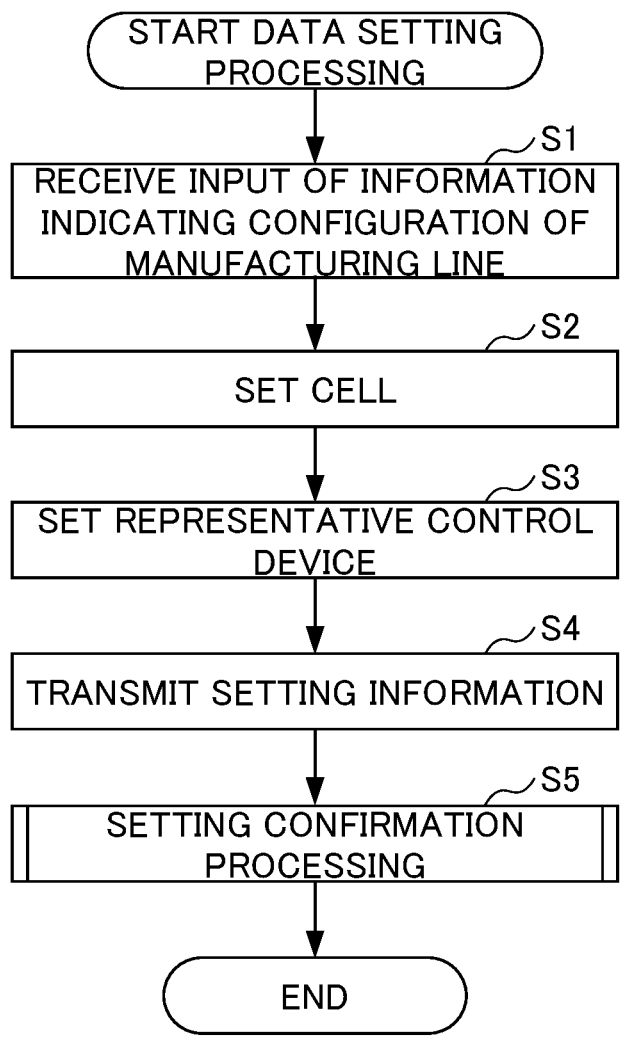
FIG. 4 is a flowchart illustrating the flow of data setting processing which is performed by the management device.

FIG. 4 is a flowchart illustrating the flow of the data setting processing which is performed by the management device 30. The data setting processing is started by inputting, through the input portion 34, an instruction to start up the data setting processing.

When the data setting processing is started, in step S1, the setting acceptance portion 31a accepts the input of information indicating the configuration of the manufacturing line by the operator (for example, the function of each of the robots 10 configuring the cell, the number of cells configured and the IP address of the control device 20 serving as the representative control device. In step S2, the group setting portion 31b specifies, based on the information indicating the configuration of the manufacturing line accepted by the setting acceptance portion 31a, the robots 10 configuring each cell so as to set the cell.

In step S3, based on the IP address of the control device 20 serving as the representative control device accepted by the setting acceptance portion 31a, the group setting portion 31b notifies the control device 20 specified as the representative control device that the control device 20 is the representative control device of the data group, and thus the representative control device of each data group is set.

Figure 5:
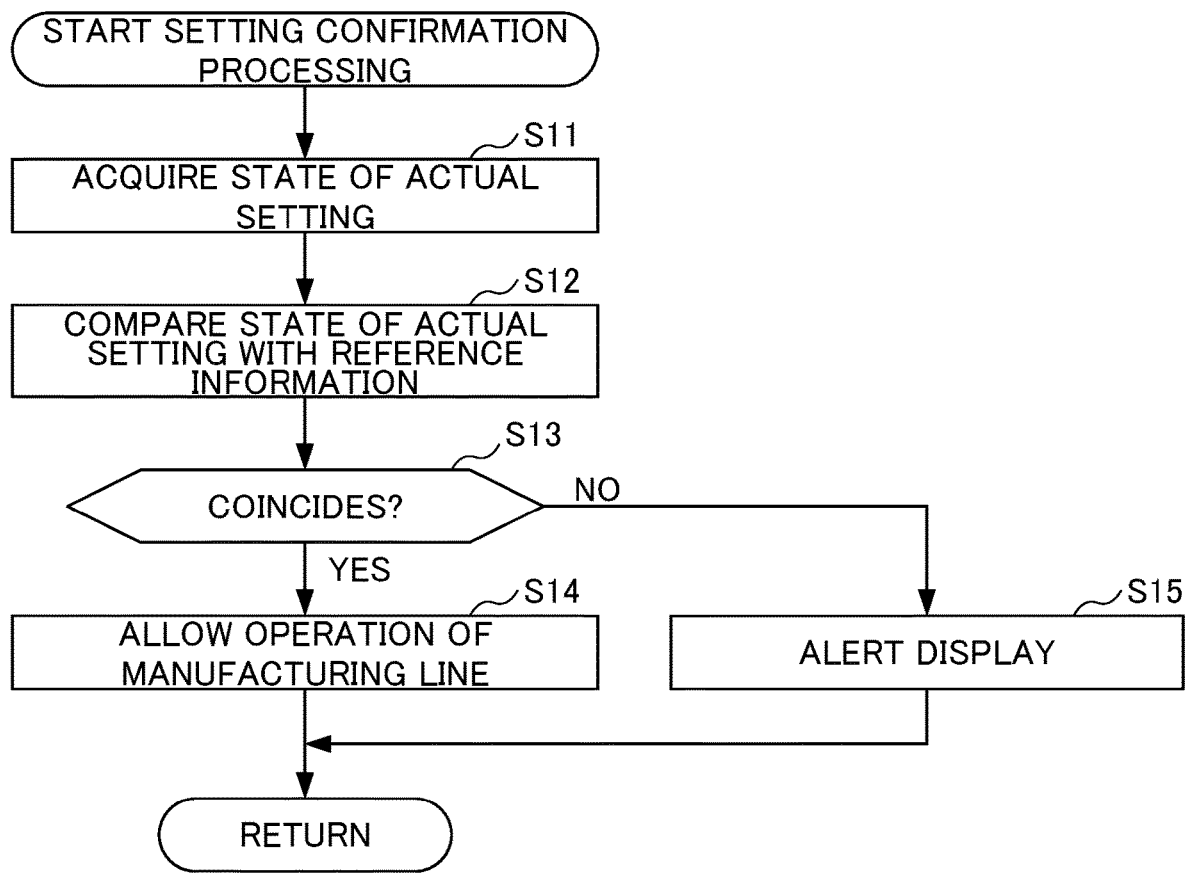
FIG. 5 is a flowchart illustrating the flow of setting confirmation processing.

In step S4, for the data groups G1 to G4, the setting transmission portion 31c transmits the data and the programs (setting information) corresponding to the control devices 20 configuring each of the data groups to the control device 20 serving as the representative control device. In step 35, the line management, portion 31d performs the setting confirmation processing for confirming the state of the setting of each of the control devices. After step S5, the data setting processing is completed.
[Setting Confirmation Processing]
The setting confirmation processing performed in step S5 of the data setting processing will then be described. FIG. 5 is a flowchart illustrating the flow of the setting confirmation processing.

When the setting confirmation processing is started, in step S11, the line management portion 31d acquires the state of the setting of each of the control devices 20 (the state of the actual setting). For example, the line management portion 31d requests each of the control devices 20 to transmit data indicating the state of the actual setting based on the setting file, and thereby acquires the state of the setting from each of the control devices 20.

In step S12, the line management portion 31d compares the state of the setting acquired (the state of the actual setting) with the reference information indicating the state of the intended setting. In step S13, the line management portion 31d determines whether or not the state of the setting acquired (the state of the actual setting) coincides with the reference information indicating the state of the intended setting. When the state of the setting acquired (the state of the actual setting) coincides with the reference information indicating the state of the intended setting, in step S13, the determination is yes, and thus the processing is transferred to step S14. On the other hand, when the state of the setting acquired (the state of the actual setting) does not coincide with the reference information indicating the state of the intended setting, in step S13, the determination is no, and thus the processing is transferred to step S15.

In step S14, the line management portion 31d determines that the settings of the control devices 20 are completed so as to allow the operation of the manufacturing line. In step S15, the line management portion 31d determines that the settings of the control devices 20 are not completed so as to display (alert display), on the display portion 35, the IP address of the control device 20 in which the state of the setting does not coincide with the reference information and the details of the setting which do not coincide therewith. After steps S14 and S15, the processing is returned to the data setting processing.

[Setting Transmission Processing]

Figure 6:
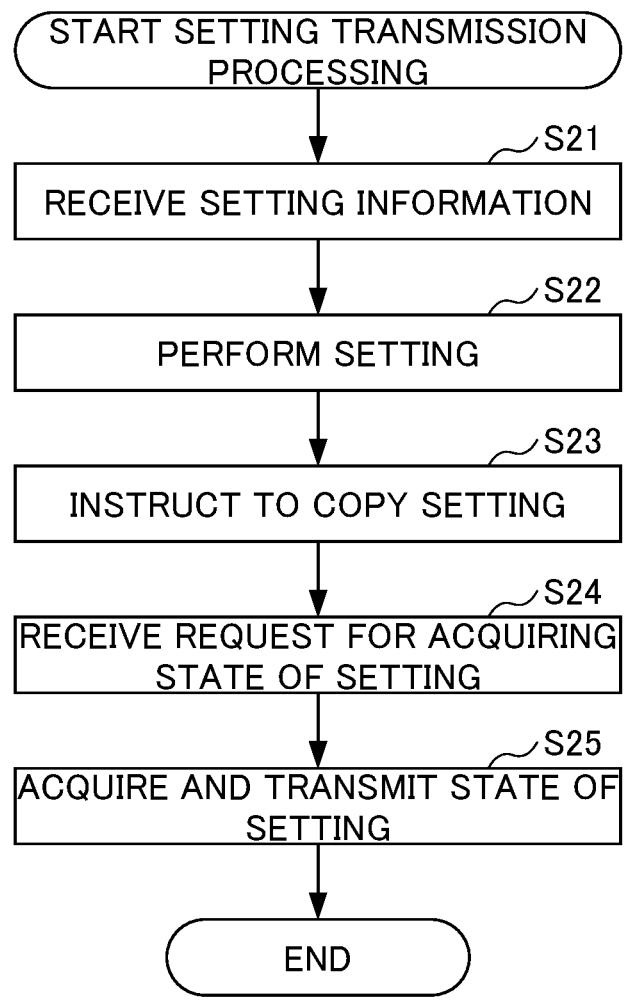
FIG. 6 is a flowchart illustrating the flow of setting transmission processing which is performed by the control device.

The setting transmission processing performed by the control device 20 will then be described. Before the performance of the setting transmission processing, the individual control devices 20 execute the group determination program so as to determine the data groups G1 to G4 for a plurality of robots 10. FIG. 6 is a flowchart illustrating the flow of the setting transmission processing which is performed by the control device 20. The setting transmission processing is started so as to correspond to the performance of the data setting processing in the management device 30.

When the setting transmission processing is started, in step S21, the setting reception portion 21b receives the data and the programs (setting information) from the management device 30. The data and the programs received here are stored in the storage portion 26. The setting reception portion 21b receives, among the data and the programs for the control devices 20 in each data group transmitted by the management device 30, the data and the programs for the data group to which the control device 20 belongs.

In step S22, the setting performance portion 21c produces a setting file for setting the present device (the control device 20) with the data and the programs received by the setting reception portion 21b, and performs the setting of the present device based on the setting file. The setting file produced here is stored in the storage portion 26.

In step S23, the setting instruction portion 21e transmits an instruction to the other control devices 20 of the data group where the control device 20 is the representative control device to copy the same setting as the present device. Here, the setting instruction portion 21e transmits the setting file produced by the setting performance portion 21c to the other control devices 20 of the data group where the control device 20 is the representative control device, and instructs them to copy the setting file.

In step S24, the setting performance portion 21c receives the request for acquiring the state of the actual setting from the management device 30. In step S25, the setting performance portion. 21c acquires the state of the actual setting in the control devices 20 and transmits it to the management device 30. After step S25, the setting transmission processing is completed.

As described above, in the data setting system 1 according to the present embodiment, the cells of a plurality of robots 10 are configured according to the configuration of the manufacturing line, and in each of the cells, any one of the control devices 20 having the same function is set to the representative control device which represents the control devices 20 having the function. Then, when settings are made on the control devices 20, the management device 30 transmits, to the representative control device of each data group, an instruction for the setting on the control devices 20 of the data group. When the control device 20 serving as the representative control device receives, from the management device 30, the instruction for the setting of the control devices 20, the control device 20 serving as the representative control device makes a setting for the present device and transmits an instruction to the other control devices 20 of the data group to copy the setting of the present device. The other control devices 20 receive this instruction so as to perform the copying of the setting, and thereby install the same function as the control device 20 serving as the representative control device.

In this way, the management device 30 which makes settings on a plurality of types of functions only makes a setting for one control device 20 (the representative control device) on each of the functions, and the control device 20 serving as the representative control device only makes a plurality of control devices 20 (the control devices 20 within each data group) copy the same setting, with the result that it is possible to more easily make settings for controlling a plurality of robots 10. In other words, according to the data setting system 1, it is possible to more easily make settings for a plurality of robots.

In the data setting system 1 according to the present embodiment, the management device 30 acquires the state of the setting of each of the control devices 30, and compares it with the reference information indicating the state of the intended setting so as to confirm whether or not the state of the actual setting of each of the control devices 20 is appropriate. The issuer of the reference information is produced by an entity which is different from the information indicating the configuration of the manufacturing line input to the management device 30. Hence, the function of checking the information by a plurality of entities is exerted, and thus it is possible to enhance the reliability of accuracy of the information which is set.

In the data setting system 1 according to the present embodiment, when the cells and the data groups are set, the IP addresses (address information) are used. In this way, as compared with a case where special information which indicates the cell or the data group to each of the robots 10 is sequentially set, it is possible to and flexibly set the cell or the data group.

[Variation 1]

Although in the embodiment described above, the representative control devices which represent the data groups of a plurality of control devices 20 installed in the manufacturing line are installed, there is no limitation to this configuration. Specifically, the management device 30 may have the function of the representative control device of each of the data groups, produce the setting file for each of the data groups based on the information indicating the configuration of the manufacturing line input by the operator and transmit, through the setting transmission portion 31c, the produced setting file to the control devices 20 in each of the data groups. In this case, the IP address of the control devices 20 belonging to the same data group may be specified such that the setting file is efficiently transmitted such as by multicasting. In this way, it is possible to omit the time and effort necessary for setting the representative control device, and thus it is possible to make settings for the robots by a simpler processing procedure. In other words, it is possible to more easily make settings for a plurality of robots.

Although in the embodiment described above, the setting instruction portion 21e of the control device 20 serving as the representative control device transmits the setting file produced by the setting performance portion 21c to the other control devices 20 of the data group where the control device 20 is the representative control device, and provides an instruction to them to copy the setting file, there is no limitation to this configuration. For example, the setting instruction portion 21e may transmit the data and the programs received by the setting reception portion 21b from the management device 30 to the other control devices 20 of the data group, and each of the control devices 20 may produce the setting file. Although in the embodiment described above, the management device 30 makes a setting for the control device 20 serving as the representative control device, and the control device 20 serving as the representative control device transmits the setting to the other control devices 20 within the data group, that is, the setting for each of the control devices 20 is made by the three-level system configuration including the management device 30, there is no limitation to this configuration. For example, the sub-groups of the control devices 20 are produced within the data group, and representative control devices are further set within the sub-groups, with the result that a four-level system configuration may be formed. The number of levels is further increased, and thus five or more levels can be adopted. In this way, since it is possible to flexibly change the number of levels of the data groups according to the number of control devices 20 configuring the data group or the like, it is possible to more easily make settings for a plurality of robots.

All or part of the function of the data setting system 1 in the embodiment described above can be realized by hardware, software or a combination thereof. Here, the realization by software means that a processor reads and executes programs so as to achieve the realization. When all or part of the function is configured with hardware, part or all of the function of the data setting system 1 can be configured with, for example, an integrated circuit (IC) such as an ASIC (Application Specific Integrated Circuit), a gate array, an FPGA (Field Programmable Gate Array) or a CPLD (Complex Programmable Logic Device).

When all or part of the function of the data setting system 1 is configured with software, in a computer configured with a storage portion such as a hard disc or a ROM storing programs describing all or part of the operation of the data setting system 1, a DRAM storing data necessary for computation, a CPU and buses connecting individual portions, information necessary for computation is stored in the DRAM, the programs are operated by the CPU and thus it is possible to achieve the realization.

These programs are stored with various types of computer-readable media, and can be supplied to the computer. The computer-readable media include various types of tangible recording media. Examples of the computer-readable medium include magnetic recording media (for example, a flexible disc, a magnetic tape and a hard disc drive), magneto-optical recording media (for example, a magneto-optical disc), a CD-ROM (Read Only Memory), a CD-R, a CD-R/W and semiconductor memories (for example, a mask ROM, a PROM (Programmable ROM), an EPROM (Erasable PROM), a flash memory and a RAM (Random Access Memory)). These programs may be distributed by being downloaded into a computer of the user through a network.

Although the embodiment of the present invention is described in detail above, the embodiment described above simply indicates a specific example for practicing the present invention. The technical scope of the present invention is not limited to the embodiment described above. The present invention can be modified variously without departing from the spirit thereof, and they are also included in the technical scope of the present invention.

EXPLANATION OF REFERENCE NUMERALS 1 data setting system
10, 10-1 to 10-n robot
20, 20-1 to 20-n control device
21, 31 CPU
21a address management portion
21b setting reception portion
21c setting performance portion
21d robot control portion
21e setting instruction portion
31a setting acceptance portion
31b group setting portion
31c setting transmission portion
31d line management portion
22, 32 ROM
23, 33 RAM
24, 34 input portion
25, 35 display portion
26, 36 storage portion
27, 37 communication portion
30 management device
40 network

What is claimed is:

1. A data setting system comprising:
a plurality of control devices that control robots, the control devices including a representative control device; and
a management device that manages the control devices, wherein the control devices and the management device are connected through a network,
wherein the management device sets, among the control devices, a plurality of cells corresponding to groups of the robots which cooperatively perform machining on a product,
the management device sets a plurality of data groups, each of the data groups being formed with a group of control devices for which a same function is set among the control devices in the cells,
the management device transmits, to each of the data groups, setting information for setting the group of control devices belonging to the data group, and
the representative control device sets the group of control devices belonging to a same data group as the representative control device based on the setting information transmitted from the management device.

2. The data setting system according to claim 1, wherein the management device transmits the setting information to the representative control device, the representative control device being any one of the control devices in the group of control devices belonging to the data group of the representative control device, and
the control device further comprises:
the representative control device transmits, to the other control devices in the group of control devices belonging to the same data group as the representative control device, setting information for performing the setting of the other control devices based on the setting information transmitted from the management device.

3. The data setting system according to claim 1, wherein the management device transmits the setting information to the representative control device, the representative control device being any one of the control devices in the group of control devices for which the same function is set in each of the cells.

4. The data setting system according to claim 1, wherein the management device further comprises:
a wherein the management device acquires a state of the setting of the representative control device so as to confirm whether or not the state of the setting coincides with the transmitted setting information.

5. The data setting system according to claim 1, wherein each of the data groups are determined based on address information set for the robots.

6. The data setting system according to claim 1, wherein the management device is configured with any one of the control devices.

7. A data setting method performed in a data setting system including (i) a plurality of control devices that control robots, the control devices including a representative control device, and (ii) a management device that manages the control devices, the control devices and the management device being connected through a network, the data setting method comprising:
setting, using the management device, a plurality of cells corresponding to groups of the robots, among the control devices, which cooperatively perform machining on a product;
setting, using the management device, a plurality of data groups, each of the data groups being formed with a group of control devices for which a same function is set among the control devices in the cells;
transmitting, to each of the data groups using the management device, setting information for setting the group of control devices belonging to the data group; and
setting, using the representative control device, the group of control devices belonging to a same data group as the representative control device based on the setting information transmitted from the management device.

8. A non-transitory computer readable recording medium having stored thereon a program which instructs a computer configuring a management device in a data setting system, the data setting system including (i) plurality of control devices that control robots and (ii) the management device that manages the control devices, the control devices and the management device being connected through a network, the program causing the computer configuring the management device to perform:
setting, using the management device, a plurality of cells corresponding to groups of the robots, among the control devices, which cooperatively perform machining on a product;
setting a plurality of data groups, each of the data groups being formed with a group of control devices for which a same function is set among the control devices in the cells; and
transmitting, to each of the data groups, setting information for setting the group of control devices belonging to the data group.

9. A non-transitory computer readable recording medium having stored thereon a program which instructs a computer configuring a representative control device included in a plurality control devices in a data setting system, the data setting system including (i) the control devices that control robots and (ii) a management device that manages the control devices, the control devices and the management device being connected through a network, the program causing the computer configuring the representative control device to perform:
setting based on cell setting information and data group setting information, the cell setting information and the data group setting information being both transmitted from the management device,
wherein the cell setting information is for setting, among the control devices, a plurality of cells corresponding to groups of the robots which cooperatively perform machining on a product,
the data group setting information is for setting, for each data group formed with a group of control devices for which a same function is set among the control devices in the cells, the group control devices belonging the data group, and
the setting based on the cell setting information and the data group setting information includes setting the group of control devices belonging to a same data group as the representative control device.

* * * * *